United States Patent
Hirai

(10) Patent No.: US 7,191,212 B2
(45) Date of Patent: Mar. 13, 2007

(54) SERVER AND WEB PAGE INFORMATION PROVIDING METHOD FOR DISPLAYING WEB PAGE INFORMATION IN MULTIPLE FORMATS

(75) Inventor: Makiko Hirai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 718 days.

(21) Appl. No.: 10/455,354

(22) Filed: Jun. 6, 2003

(65) Prior Publication Data

US 2003/0233617 A1 Dec. 18, 2003

(30) Foreign Application Priority Data

Jun. 7, 2002 (JP) ............................. 2002-167353

(51) Int. Cl.
*G06F 15/173* (2006.01)
(52) U.S. Cl. ..................................... 709/203
(58) Field of Classification Search ............... 709/203, 709/217
See application file for complete search history.

(56) References Cited

U.S. PATENT DOCUMENTS 6,154,740 A * 11/2000 Shah ............................. 707/7
6,199,114 B1 * 3/2001 White et al. ................ 709/229

* cited by examiner

*Primary Examiner*—David Y. Eng
(74) *Attorney, Agent, or Firm*—Oblon, Spivak, McClelland, Maier & Neustadt, P.C.

(57) ABSTRACT

A user terminal sends registration target data regarding a web page to a server. The server receives the data and stores the data in a registration DB. The server reads out registration target data from the registration DB in response to a request from the user terminal. Next, the server generates data representing a screen for displaying contents of the read-out registration target data in accordance with an information providing manner desired by the user of the user terminal. This information-providing manner specifies a display format of the screen for displaying the contents of the read-out data. The server provides the generated screen data to the user terminal which has sent the request.

15 Claims, 12 Drawing Sheets

FIG. 4

REGISTRATION TARGET DATA

| |
|---|
| USER ID |
| URL |
| TITLE |
| SCREEN IMAGE |
| CATEGORY |
| ACCESS NUMBER |
| REGISTRATION DATE |
| COMMENTS |
| ... |
| ... |
| ... |

FIG. 8

INFORMATION PROVIDING MANNER
SELECTION SCREEN (1) "LIST OF WEBPAGE URLS"
(2) "LIST OF WEBPAGE TITLES"
(3) "LIST OF WEBPAGE THUMBNAILS"

⋮

PLEASE SELECT DISPLAY MANNER

SEND          CANCEL

SERVER AND WEB PAGE INFORMATION PROVIDING METHOD FOR DISPLAYING WEB PAGE INFORMATION IN MULTIPLE FORMATS

BACKGROUND OF THE INVENTION

1. Field of the Invention

The present invention relates to a server which provides web page information to a client apparatus based on a web page information-providing manner requested by a user among a plurality of web page information providing manners, and also relates to a web page information providing method.

2. Description of the Related Art

Suppose that someone browses web pages sited on the Internet using a computer, and finds a favorite web page. In this case, he/she can store information representing the favorite web page such as its title and URL (Uniform Resource Locator) in his/her computer, by using a browser installed in the computer. The computer running on the browser generates a list screen for displaying the URLs and titles of favorite web pages. One can select a desired information regarding URL or title of a favorite web page from this list screen in order to use stored web page information.

However, if the number of stored web page information increases, one can not recall the content of a web page at a glance from the list screen, and has a hard time finding out a desired web page from the list screen.

SUMMARY OF THE INVENTION

The present invention was made in view of the above situation, and an object of the present invention is to provide a server and a web page information providing method which can organize stored information such that a user can easily understand the contents of the stored information.

To achieve the above object, a server according to a first claim of the present invention is connected to a plurality of clients through a network and which comprises a control unit and a storage unit, wherein the control unit: (a) receives an information regarding a web page which a user of each of said clients obtains by browsing on the Internet, and which is to be transmitted from each of said clients; (b) stores the information regarding the web page in said storage unit user by user; (c) reads out, in response to a request from each of said clients, information corresponding to the user of each of said clients which has sent the request, among information stored user by user from said storage unit; (d) generates screen for displaying in a list, contents of the read-out information in accordance with a display format which is specified by an information providing manner selected by the user from among a plurality of information providing manners for specifying the display formats, the display formats specified by the plurality of information providing manners being different from one another; and (e) provides the generated screen to each of said clients which has sent the request.

The server having the above-described structure provides a screen for displaying the contents of the information regarding web pages to the client. On this screen, the contents of the information regarding web pages are displayed in a list in accordance with a display format desired by a user. The user can easily grasp the contents of the information regarding web pages from this screen at a glance. Accordingly, the user can easily find out information regarding a desired web page from this screen.

Each information may include a web page URL, a title, a screen image, user's comments on a web page, a category, a registration date, and an access number as elements.

The control unit may further generate a screen for displaying thumbnails of screen images of web pages in a list using the screen image.

The control unit may further: read out the information which satisfy a predetermined condition from said storage unit, generate a screen for displaying web pages represented by the read-out information, and provides the screen to said client; receive specification information for specifying a web page which is selected by the user of said client from among the displayed web pages on the screen, from said client to which the screen have been provided; and delete the information representing the specified web page from said storage unit, based on the received specification information.

The control unit may read out information each regarding a web page achieving access number of equal to or less than a predetermined number from said storage unit.

The control unit may further refer to the information each regarding a web page which are stored in said storage unit, generates information representing a registration context in said storage unit web page by web page, and discloses the generated information through said network.

To achieve the above object, a web page information providing method according to a second aspect of the present invention is applied to a server connected to a plurality of clients through a network, the method comprising:

(a) receiving an information regarding a web page which a user of each of said clients obtains by browsing on the Internet, and which is to be transmitted from each of said clients; (b) storing the information regarding the web page user by user; (c) reading out, in response to a request from each of said clients, information corresponding to the user of each of said clients which has sent the request, among information stored user by user; (d) generating screen for displaying in a list, contents of the read-out information in accordance with a display format which is specified by an information providing manner selected by the user from among a plurality of information providing manners for specifying the display formats, the display formats specified by the plurality of information providing manners being different from one another; and (e) providing the generated screen to each of said clients which has sent the request.

According to this method, a screen for displaying contents of information regarding web pages in a list in accordance with a display format desired by a user is provided from the server to the client. The user can easily grasp the contents of the information regarding web pages from the screen provided from the server. Accordingly, the user can easily find out information regarding his/her desired web page from this screen.

The web page information providing method may further comprise storing the information which includes a web page URL, a title, a screen image, user's comments on a web page, a category, a registration date, and an access number.

The web page information providing method may further comprising generating thumbnails by using screen images of web pages, and generating a screen for displaying the thumbnails in a list.

The web page information providing method may further comprising: reading out the information which satisfy a predetermined condition from said storage unit, generating a screen for displaying web pages represented by the read-out information, and providing the screen to said client; receiving specification information for specifying a web page which is selected by the user of said client from among the displayed web pages on the screen, from said client to which the screen have been provided; and deleting the information representing the specified web page from said storage unit, based on the received specification information.

The web page information providing method may further comprising reading out information each regarding a web page achieving access number of equal to or less than a predetermined number from said storage unit.

The web page information providing method may further comprising referring to the information each regarding a web page which are stored in said storage unit, generates information representing a registration context in said storage unit web page by web-page, and discloses the generated information through said network.

To achieve the above object, a program according to a third aspect of the present invention is applied to a server connected to a plurality of clients through a network, the program controlling the server to perform: (a) a process of receiving an information regarding a web page which a user of each of said clients obtains by browsing on the Internet, and which is to be transmitted from each of said clients; (b) a process of storing the information regarding the web page user by user; (c) a process of reading out, in response to a request from each of said clients, information corresponding to the user of each of said clients which has sent the request, among information stored user by user; (d) a process of generating screen for displaying in a list, contents of the read-out information in accordance with a display format which is specified by an information providing manner selected by the user from among a plurality of information providing manners for specifying the display formats, the display formats specified by the plurality of information providing manners being different from one another; and (e) a process of providing the generated screen to each of said clients which has sent the request.

By applying this program to the server, a screen for displaying contents of information regarding web pages in a list in accordance with a display format desired by a user is sent from the server to the client. The user can easily grasp the contents of the information regarding web pages from the screen sent from the server. Accordingly, the user can easily find out the information regarding his/her desired web page from this screen.

The program may further control the server to perform a process of storing the information which includes a web page URL, a title, a screen image, user's comments on a web page, a category, a registration date, and an access number.

The program may further control the server to perform a process of generating thumbnails by using screen images of web pages, and a process of generating a screen for displaying the thumbnails in a list.

The program may further control the server to perform: a process of reading out the information which satisfy a predetermined condition from said storage unit, generating a screen for displaying web pages represented by the read-out information, and providing the screen to said client; a process of receiving specification information for specifying a web page which is selected by the user of said client from among the displayed web pages on the screen, from said client to which the screen have been provided; and a process of deleting the information representing the specified web page from said storage unit, based on the received specification information.

The program may further control the server to perform a process of reading out information each regarding a web page achieving access number of equal to or less than a predetermined number from said storage unit.

The program may further control the server to perform a process of referring to the information each regarding a web page which are stored in said storage unit, generates information representing a registration context in said storage unit web page by web page, and discloses the generated information through said network.

BRIEF DESCRIPTION OF THE DRAWINGS

These objects and other objects and advantages of the present invention will become more apparent upon reading of the following detailed description and the accompanying drawings in which:

FIG. 4 is a diagram for explaining a data structure of registration target data;

FIG. 8 is a diagram showing a list displayed on an information providing manner selection screen;

DETAILED DESCRIPTION OF THE PREFERRED EMBODIMENTS

A server and a web page information providing method according to one embodiment of the present invention will be specifically explained with reference to the drawings, by employing a web page information providing system as an example.

Figure 1:
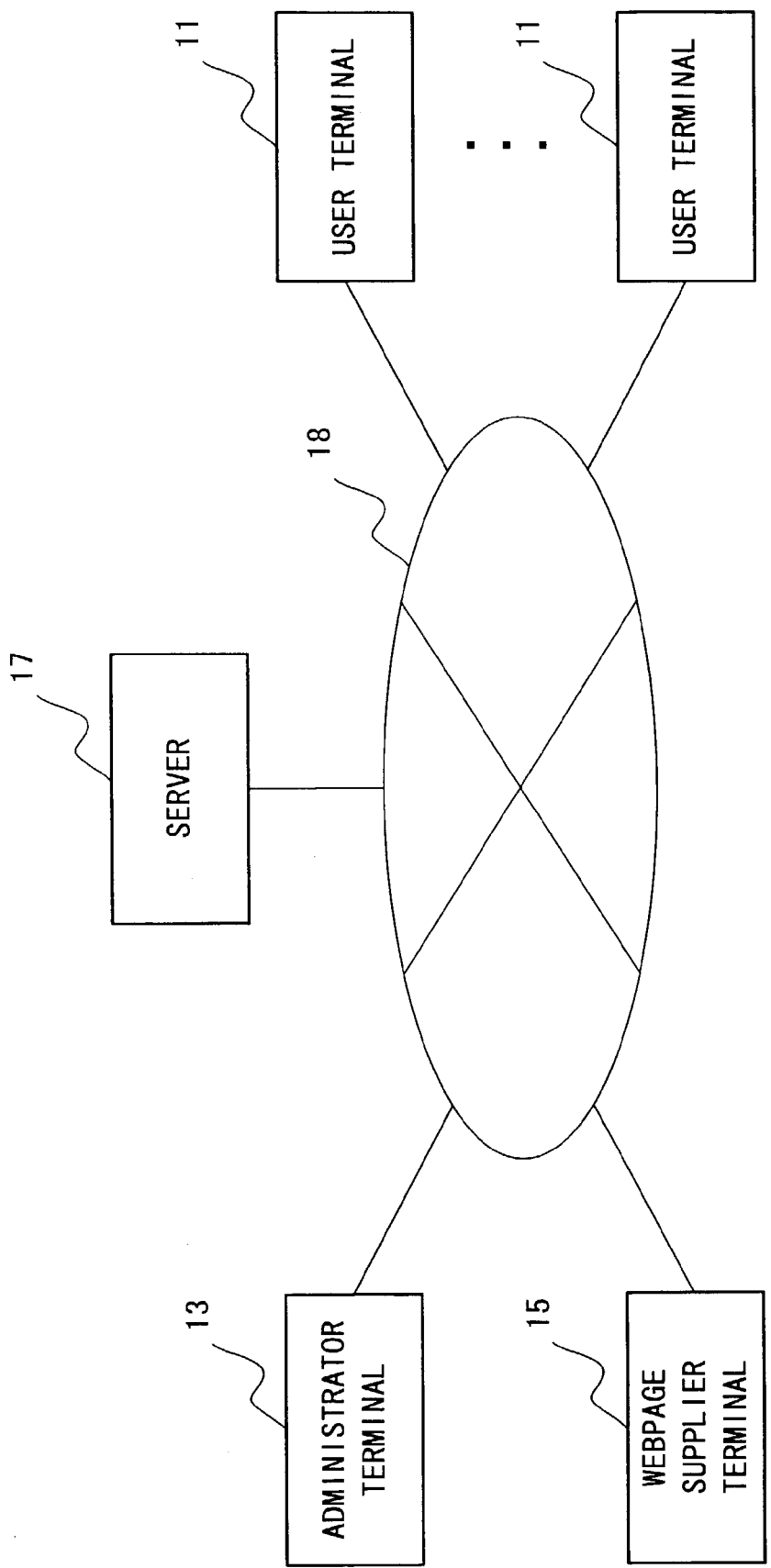
FIG. 1 is a block diagram showing a structure of a web page information providing system according to an embodiment of the present invention.

As shown in FIG. 1, the web page information providing system comprises a plurality of user terminals (clients) 11, a server administrator terminal 13, one or more web page supplier terminals 15, and a server 17. The user terminals 11, the server administrator terminal 13, the web page supplier terminals 15, and the server 17 are connected to one another through a network 18 such as the Internet, etc.

Figure 2:
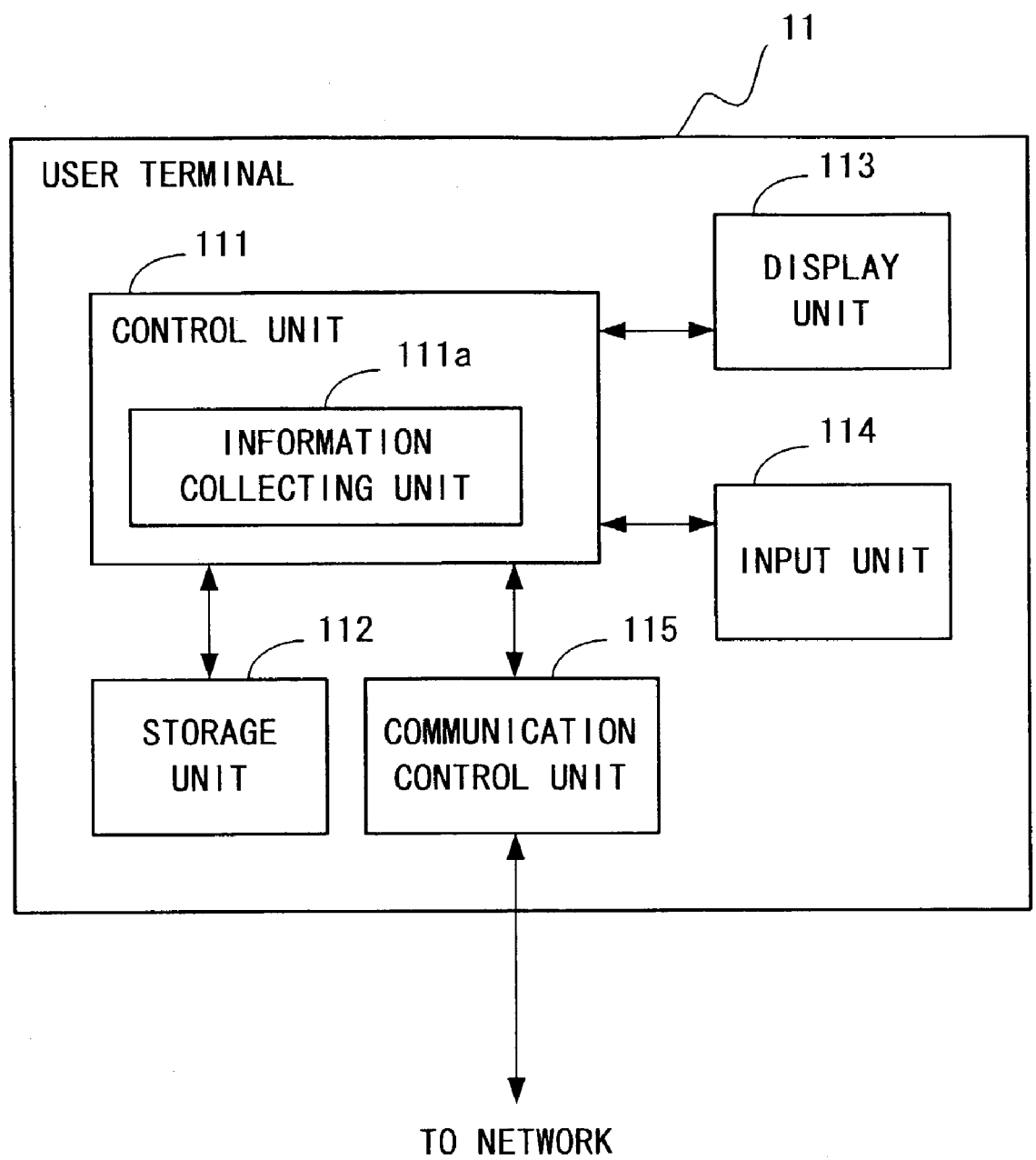
FIG. 2 is a block diagram showing a structure of a user terminal shown in FIG. 1.

The user terminal 11 is constituted by, for example, a computer, a portable terminal, or a cellular phone. As shown in FIG. 2, the user terminal 11 comprises a control unit 111, a storage unit 112, a display unit 113, an input unit 114, and a communication control unit 115.

The control unit 111 is constituted by, for example, a CPU (Central Processing Unit). The control unit 111 functions as an information-collecting unit 111a by executing a program stored in the storage unit 112.

In response to an operation of a user, the information collecting unit 111a acquires an information representing a web page such as a URL (Uniform Resource Locator), title, and a screen image, etc., and stores the information in the storage unit 112 as registration target data. In addition, the information collecting unit 111a includes data representing user's comments on a web page, a category, etc. in the registration target data, in accordance with an operation of the user (or automatically). Further, the information collecting unit 111a registers the registration target data stored in the storage unit 112 in the server 17, or obtains registration target data registered in the server 17.

The storage unit 112 is constituted by a ROM (Read Only Memory), a RAM (Random Access Memory), a hard disk, etc. The storage unit 112 stores a program to be executed by the control unit 111, various data necessary for the operation of the control unit 111, and the registration target data.

The display unit 113 is constituted by a display device such as a CRT and a liquid crystal display, etc. The display unit 113 displays various screens under the control of the control unit 111.

The input unit 114 is constituted by an input device such as a mouse, a keyboard, etc.

The communication control unit 115 establishes connection to the server 17, etc. via the network 18 under the control of the control unit 111, and transmits/receives information with the server 17, for example.

The administrator terminal 13 shown in FIG. 1 is operated by an administrator of the server 17. The administrator terminal 13 is constituted by, for example, a computer. The administrator terminal 13 connects to the server 17 by executing a program stored in a storage unit (not shown) in response to an operation of the administrator, and executes various operations to administrate the server 17. For example, the administrator terminal 13 registers a user ID, etc. assigned by the administrator to a user who wants to use the server 17, in the server 17.

The web page supplier terminal 15 is operated by a web page supplier who made a web page available to others through the Internet. The web page supplier terminal 15 is constituted by, for example, a computer. The web page supplier terminal 15 connects to the server 17 by executing a program stored in a storage unit (not shown) in response to an operation of the web page supplier, and notifies information for specifying the web page of the web page supplier (such as a URL) to the server 17. Further, the web page supplier terminal 15 obtains statistical information such as how many users register the web page of the web page supplier in the server 17, from the server 17.

Figure 3:
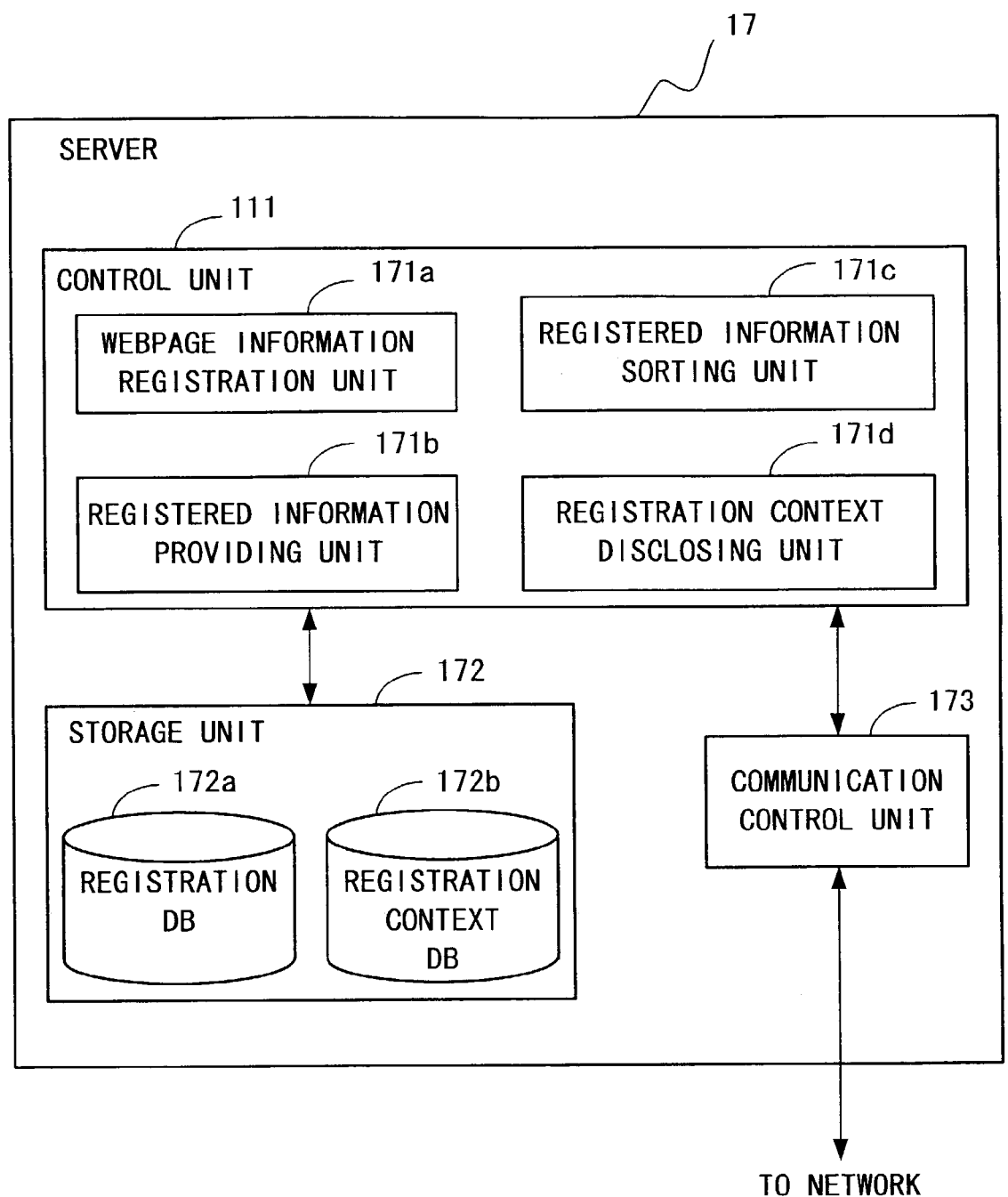
FIG. 3 is a block diagram showing a structure of a server shown in FIG. 1.

The server 17 is constituted by, for example, a computer. As shown in FIG. 3, the server 17 comprises a control unit 171, a storage unit 172, and a communication control unit 173.

The control unit 171 is constituted by, for example, a CPU. The control unit 171 functions as a web page information registration unit 171a, a registered information providing unit 171b, a registered information sorting unit 171c, and a registration context disclosing unit 171d, by executing a program stored in the storage unit 172.

The web page information registration unit 171a receives information (registration target data) from the user terminal 11. Each information regards a web page. The web page information registration unit 171a registers (stores) the received information associating with a user ID in a registration database 172a included in the storage unit 172, as shown in FIG. 4. FIG. 4 illustrates an example of a case that an user ID is associated with information regarding a web page such as a URL, a title, a screen image of the web page, a category, an access number, a registration date, user's comments.

The registered information providing unit 171b shown in FIG. 3 executes a series of operation: reads out each user's desired data item among the registration target data items (registered information) of each user from the registration database 172a included in the storage unit 172, in response to a request from each user terminal 11. The registered information providing unit 171b sends the read-out data item to the user terminal 11 which has sent the request.

In this series of operations, the registered information providing unit 171b generates data representing a screen for displaying the content of the registration target data in an information providing manner selected by the user from a plurality of information providing manners, and sends the generated data to the user terminal 11.

Information providing manners, operations executed by the registered information providing unit 171b based on these information-providing manners, and screens generated by these operations will be specifically explained. In the present embodiment, seventeen kinds of web page information providing manners are employed.

(1) "List of Web Page URLs"

In a case where the user selects the present information providing manner, the registered information providing unit 171b extracts data items representing URLs from the registration target data. The registered information providing unit 171b generates data representing a list screen for displaying URLs using the extracted data items, and sends the generated data to the user terminal 11.

(2) "List of Web Page Titles"

If the present information-providing manner is selected, the registered information providing unit 171b extracts data items representing titles from the registration target data. The registered information providing unit 171b generates data representing a list screen for displaying titles using the extracted data items, and sends the generated data to the user terminal 11.

(3) "List of Web Page Thumbnails"

Figure 5A:
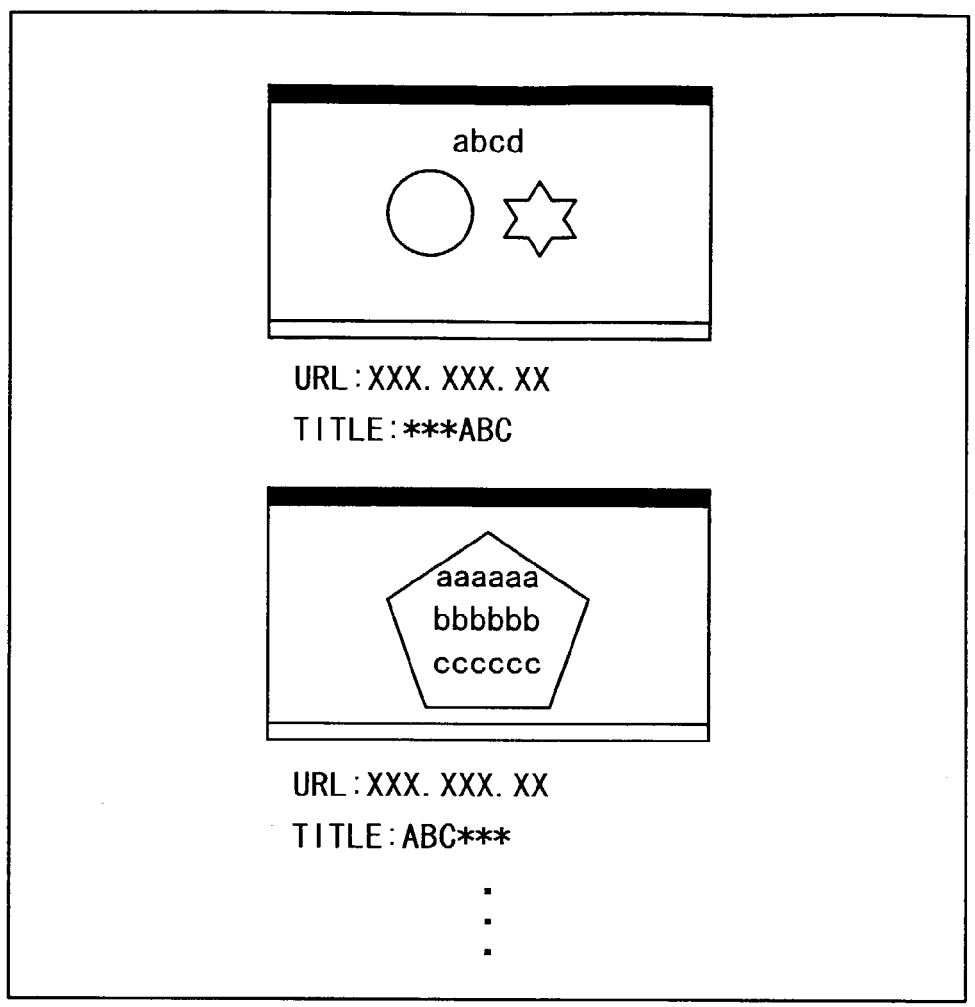
FIG. 5A and FIG. 5B are diagrams respectively showing examples of screens to be provided from the server to the user terminal.

If this information providing manner is selected, the registered information providing unit 171b extracts data items representing URLs, titles, and screen images of web pages from the registration target data. Then, the registered information-providing unit 171b reduces the data size of the screen images and generates thumbnails of the screen images. The registered information providing unit 171b generates data representing a screen for displaying a list of URLs and titles together with the thumbnails, and sends the generated data to the user terminal 11. One example of this screen is shown in FIG. 5A.

(4) "List of Thumbnails of Web Pages Including Search Keyword in Titles"

Figure 5B:
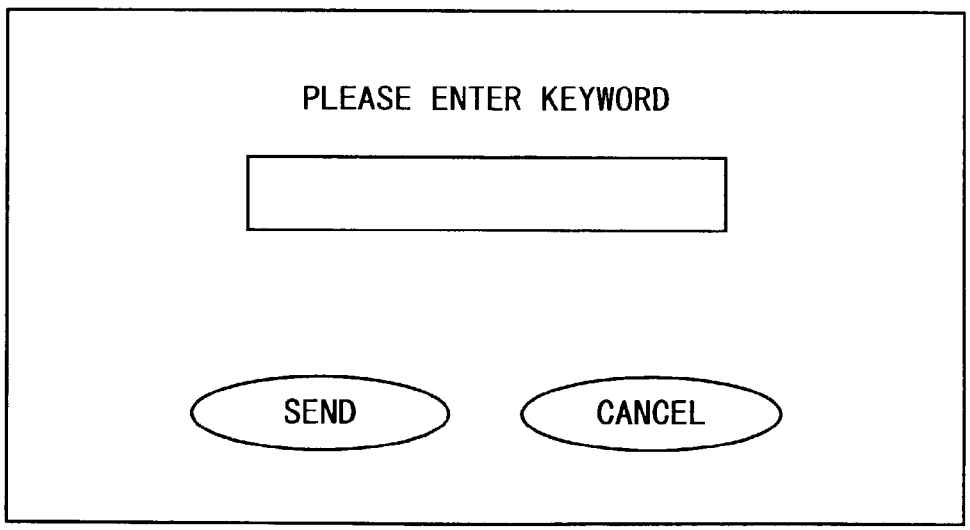

In a case where this information providing manner is selected, the registered information providing unit 171b sends data representing a screen for prompting the user to input a keyword, to the user terminal 11. One example of this screen is shown in FIG. 5B.

Next, the registered information providing unit 171b receives input of a keyword from the user terminal 11, and searches for web pages that include the keyword in their titles. The registered information-providing unit 171b generates thumbnails using data of the searched-out web pages, and generates data representing a list screen for displaying the URLs and titles together with the thumbnails. The registered information-providing unit 171b sends the data to the user terminal 11.

(5) "List of Titles Including Search Keyword"

If this information providing manner is selected, the registered information providing unit 171b sends data representing a keyword input screen to the user terminal 11, and receives input of a keyword from the user terminal 11. The registered information providing unit 171b extracts web pages that include the input keyword in titles, generates data representing a list screen for displaying these titles, and sends the generated data to the user terminal 11.

(6) "List of Titles in the Order of Higher Access Number"

If this information-providing manner is selected, the registered information providing unit 171b sorts the registration target data in the order of higher access number. The registered information providing unit 171b extracts data items representing titles from the registration target data, generates data representing a list screen for displaying the titles in the order of sorting, and sends the generated data to the user terminal 11.

(7) "List of URLs in the Order of Higher Access Number"

If this information-providing manner is selected, the registered information providing unit 171b sorts the registration target data in the order of higher access number. Then the registered information providing unit 171b generates data representing a list screen for displaying URLs in the order of sorting, using the registration target data and sends the generated data to the user terminal 11.

(8) "List of Titles in the Order of Newer Registration Date"

If this information-providing manner is selected, the registered information-providing unit 171b sorts the registration target data in the order of newer registration date. The registered information providing unit 171b generates data representing a list screen for displaying titles in the order of sorting, using the registration target data, and sends the generated data to the user terminal 11.

(9) "List of URLs in the Order of Newer Registration Date"

If this information-providing manner is selected, the registered information providing unit 171b sorts the registration target data in the order of newer registration date. Then, the registered information providing unit 171b generates data representing a list screen for displaying URLs in the order of sorting, and sends the generated data to the user terminal 11.

(10) "List of Thumbnails in the Order of Higher Access Number"

If this information-providing manner is selected, the registered information providing unit 171b sorts the registration target data in the order of higher access number. Then the registered information-providing unit 171b generates a plurality of thumbnails using the registration target data. The registered information providing unit 171b generates data representing a list screen for displaying titles and URLs together with the thumbnails in the order of sorting, and sends the generated data to the user terminal 11.

(11) "List of Thumbnails in the Order of Newer Registration Date"

If this information providing manner is selected, the registered information providing unit 171b sorts the registration target data in the order of newer registration date, and generates a plurality of thumbnails using the registration target data. Then, the registered information providing unit 171b generates data representing a list screen for displaying titles and URLs together with the thumbnails in the order of sorting, and sends the generated data to the user terminal 11.

(12) "List of Titles in Designated Category in the Order of Higher Access Number"

If this information providing manner is selected, the registered information providing unit 171b sends data representing a screen for prompting user's input operation for designating a desired category, to the user terminal 11. The registered information providing unit 171b receives designation of a category from the user terminal 11, and searches for web pages that belong to the designated category among the registration target data. Then, the registered information providing unit 171b sorts the searched-out registration target data in the order of higher access number, generates data representing a list screen for displaying titles in the order of sorting using the searched-out registration target data, and sends the generated data to the user terminal 11.

(13) "List of URLs of Web Pages in Designated Category in the Order of Higher Access Number"

If this information providing manner is selected, the registered information providing unit 171b sends data representing an input screen for designating a category, to the user terminal 11. The registered information providing unit 171b receives designation of a category from the user terminal 11, and searches for web pages that belong to the designated category among the registration target data. The registered information providing unit 171b sorts the searched-out registration target data in the order of higher access number, generates data representing a list screen for displaying URLs in the order of sorting using the searched-out registration target data, and sends the generated data to the user terminal 11.

(14) "List of Titles in Designated Category in the Order of Newer Registration Date"

If this information providing manner is selected, the registered information providing unit 171b sends data representing an input screen for designating a category, to the user terminal 11. The registered information providing unit 171b receives designation of a category from the user terminal 11, and searches for registration target data that belong to the designated category. The registered information providing unit 171b sorts the searched-out registration target data in the order of newer registration date, generates data representing a list screen for displaying titles in the order of sorting using the searched-out registration target data, and sends the generated data to the user terminal 11.

(15) "List of URLs of Web Pages in Designated Category in the Order of Newer Registration Date"

If this information providing manner is selected, the registered information providing unit 171b sends data representing an input screen for designating a category, to the user terminal 11. The registered information-providing unit 171b receives designation of a category from the user terminal 11, and extracts registration target data that belong to the designated category. The registered information providing unit 171b sorts the extracted registration target data in the order of newer registration date, generates data representing a list screen for displaying URLs in the order of sorting using the extracted registration target data, and sends the generated data to the user terminal 11.

(16) "List of Thumbnails of Web Pages in Designated Category in the Order of Higher Access Number"

If this information providing manner is selected, the registered information providing unit 171b sends data representing an input screen for designating a category, to the user terminal 11. The registered information-providing unit 171b receives designation of a category from the user terminal 11, and extracts registration target data that belong to the designated category. The registered information-providing unit 171b generates thumbnails using the extracted registration target data, and sorts the extracted registration target data in the order of higher access number. The registered information providing unit 171*b* generates data representing a list screen for displaying the thumbnails, titles and URLs in the order of sorting, and sends the generated data to the user terminal 11.

(17) "List of Thumbnails of Web Pages in Designated Category in the Order of Newer Registration Date"

If this information providing manner is selected, the registered information providing unit 171*b* sends data representing an input screen for designating a category, to the user terminal 11. The registered information providing unit 171*b* receives designation of a category from the user terminal 11, and searches for registration target data that belong to the designated category. The registered information-providing unit 171*b* generates thumbnails using the searched-out registration target data, and sorts the searched-out registration target data in the order of newer registration date. Then, the registered information providing unit 171*b* generates data representing a list screen for displaying the thumbnails, titles, and URLs in the order of sorting, and sends the generated data to the user terminal 11.

Titles, thumbnails, etc. are displayed on the screen for displaying the content of the registered data based on each information-providing manner. By user's clicking any of displayed titles using the input unit 114, the user terminal 11 can access the web page having the clicked title. When access to any web page among the displayed web pages is requested, the registered information providing unit 171*b* updates the access number included in the registration target data corresponding to the requested web page.

As described above, the registered information providing unit 171*b* provides the user terminal 11 with data representing a list screen for displaying titles, thumbnails, etc. of web pages in a display format specified by a user's desired information providing manner. The registered information providing unit 171*b* stores a code (a web page information providing manner code) indicative of a web page information providing manner selected by each user in the storage unit 172 user by user. The registered information providing unit 171*b* continues to use the same web page information providing manner until it receives a request for changing web page information providing manners from the user terminal 11.

The registered information sorting unit 171*c* shown in FIG. 3 searches for registration target data among registration target data registered in the registration database 172*a*, whose access number in a predetermined period is equal to or smaller than a predetermined number, as a deletion candidate. The registered information-sorting unit 171*c* generates data representing a screen for displaying a list of deletion candidates, and sends the generated data to the user terminal 11. Further, the registered information sorting unit 171*c* deletes registration target data which is selected by the user as a deletion target.

The registration context disclosing unit 171*d* obtains information (such as a URL) from the web page supplier terminal 15 for specifying a web page opened by a web page provider. Based on this information, the registration context disclosing unit 171*d* retrieves the registration target data of all users which are stored in the registration database 172*a* once in each predetermined time period, and gather statistics about, for example, how many users register the specified web page in the server 17. Then, the registration context-disclosing unit 171*d* generates data representing a screen for displaying the statistics, and stores the generated data in the registration context database 172*b*. Further, the registration context disclosing unit 171*d* reads out the data representing the screen for displaying the statistics from the registration context database 172*b* in response to a request form the web page supplier terminal 15, and sends the read-out data to the web page supplier terminal 15 which has sent the request.

The storage unit 172 stores a program to be executed by the control unit 171 and various data necessary for processing. In addition, the storage unit 172 stores a web page information providing manner code of each user. The storage unit 172 includes the registration database (hereinafter, referred to as registration DB) 172*a* and the registration context database (hereinafter, referred to as registration context DB) 172*b*. The registration DB 172*a* stores registration target data user by user and user's personal information (such as user ID). The registration context DB 172*b* stores data representing a screen for displaying statistics generated by the registration context-disclosing unit 171*d*, in association with a URL of a web page.

The communication control unit 173 sends and receives data to and from the user terminal 11, the administrator terminal 13, the web page supplier terminal 15, etc. through the network 18 under the control of the control unit 171.

Next, an operation of the web page information providing system according to the present embodiment will be explained. The following will explain the operation of the present system by employing as an example, a case where a user is given a user ID, etc. necessary for utilizing the server 17 from the administrator of the server 17, and this user ID, etc. are thus registered in the registration DB 172*a* of the server 17.

Figure 6:
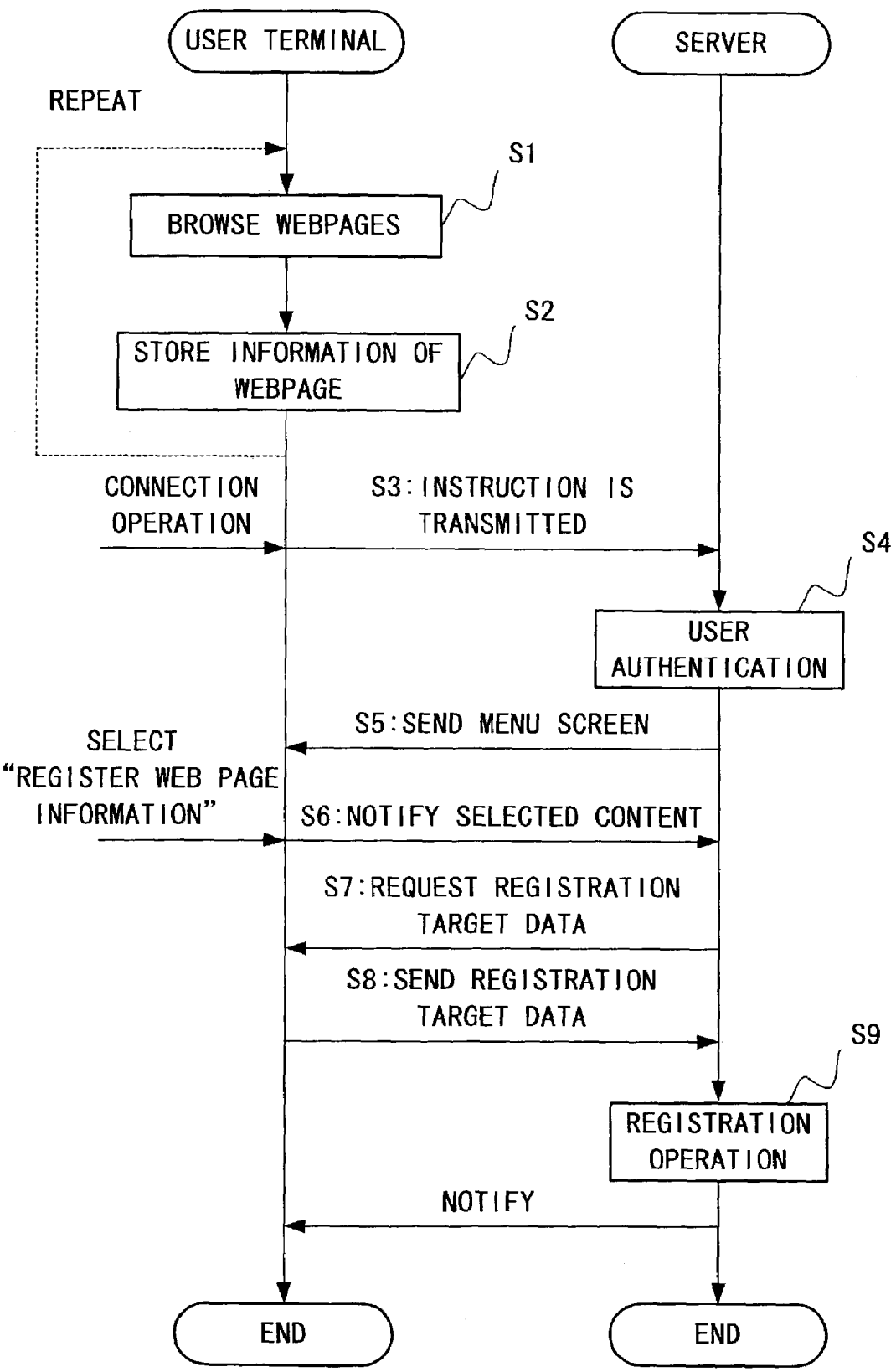
FIG. 6 is a flowchart for mainly explaining an operation of the server.

First, an operation performed by the server 17 to store registration target data will be explained with reference to FIG. 6 and FIG. 7. The right side of FIG. 6 indicates an operation performed by the server 17, and the left side thereof indicates an operation performed by the user terminal 11.

In a case that a user wants to browse web pages, the user operates the user terminal 11 to get connected to the Internet. The user terminal 11 browses web pages in accordance with the operation of the user (FIG. 6, step S1). When the user finds a favorite web page, the user performs an input operation such as clicking a predetermined button on the screen. In response to this, the user terminal 11 stores data representing such as a URL and a title of the web page, a screen image data, etc. in the storage unit 112 as a registration target data (step S2). In this step, the user terminal 11 displays a screen for prompting the user to input comments about the web page, a category name, etc. on the display unit 113, and includes these input data into the registration target data.

The user repeats the above operations using the user terminal 11 and stores registration target data regarding his/her favorite web pages in the storage unit 112 of the user terminal 11. Then the user finishes "web-browsing" with the user terminal 11 preparing the registration of the registration target data in the server 17.

Next, when the user gives an instruction to register the registration target data in the server 17, this instruction is notified to the server 17 (step S3).

In response to this notification, the server 17 stores information (for example, an IP address) for specifying the user terminal 11 which is now accessing the server 17. Next, the server 17 sends data representing a screen for prompting an input of information (such as a user ID, etc.) for verifying the user, to the user terminal 11 which is now accessing the server 17. The user terminal 11 receives the data and displays the data on the display unit 113. The user inputs information such as a user ID, etc. by operating the user terminal 11. This input information is notified to the server 17. The server 17 receives the information and verifies the user by an authentication operation with the information and the user's personal information stored in the registration DB 172a (step S4).

After verifying the user, the server 17 sends data representing a screen to the user terminal 11 (step S5). This data represents a screen for displaying an operation menu including "register web page information", "check registration target data", "search for deletion candidate", "select/change web page information providing manner", etc. as shown in FIG. 7. The user terminal 11 receives the data and displays the menu screen on the display unit 113. In this example, it is assumed that the user selects the menu item "register web page information" by operating the user terminal 11. In response to the operation of the user, the user terminal 11 notifies that the user has selected "register web page information" (step S6).

In response to this notification, the server 17 instructs the user terminal 11 to send registration target data (step S7). In response to this instruction, the user terminal 11 reads out the registration target data stored in the storage unit 112, and send the registration target data to the server 17 (step S8). In step S8, the user terminal 11 may send all the registration target data simultaneously. Or, the user may select specific registration target data, and the user terminal 11 may send the selected registration target data.

The server 17 receives the registration target data. Then, the server 17 stores the received registration target data associating with the user ID in the registration DB 172a (step S9). When storing of the registration target data is completed, the server 17 notifies the completion of storing to the user terminal 11. Then, the server 17 once finishes the operation of "register web page information". The user terminal 11 once finishes the operation for registering web page information in the server 17 in response to the notification from the server 17.

Next, an operation performed by the server 17 in a case where the user selects one of the seventeen kinds of web page information providing manners, will be explained with reference to FIG. 7 and FIG. 8.

Operations performed by the user terminal 11 and the server 17 for establishing connection, authenticating the user, and sending the menu screen, etc. are the same as those described above, and the explanation of these operations will therefore be omitted. Here, it is assumed that the user terminal 11 displays the menu screen shown in FIG. 7 on the display unit 113.

When the user gives an instruction to select "select/change web page information providing manner" from the user terminal 11, the instruction is sent to the server 17. In response to this instruction, the server 17 sends to the user terminal 11, data representing a screen shown in FIG. 8 for selecting a desired web page information providing manner from the plurality of web page information providing manners.

The user terminal 11 receives the data and displays the screen shown in FIG. 8 on the display unit 113. When the user chooses his/her desired web page information providing manner and clicks a "send" button by a mouse, etc., a web page information providing manner code corresponding to the user's choice is sent from the user terminal 11 to the server 17.

The server 17 receives this web page information providing manner code, and stores it in the storage unit 172 in association with the user ID. Thereafter, the server 17 specifies the web page information providing manner selected by the user based on this code.

An operation of the server 17 in a case where the user wants to change web page information providing manners, is the same as the operation explained above.

Next, an operation performed by the server 17 in a case where the user wants to check registration target data registered in the server 17, will be explained with reference to FIG. 5A, FIG. 5B, FIG. 7, FIG. 9, and FIG. 10.

Figure 9:
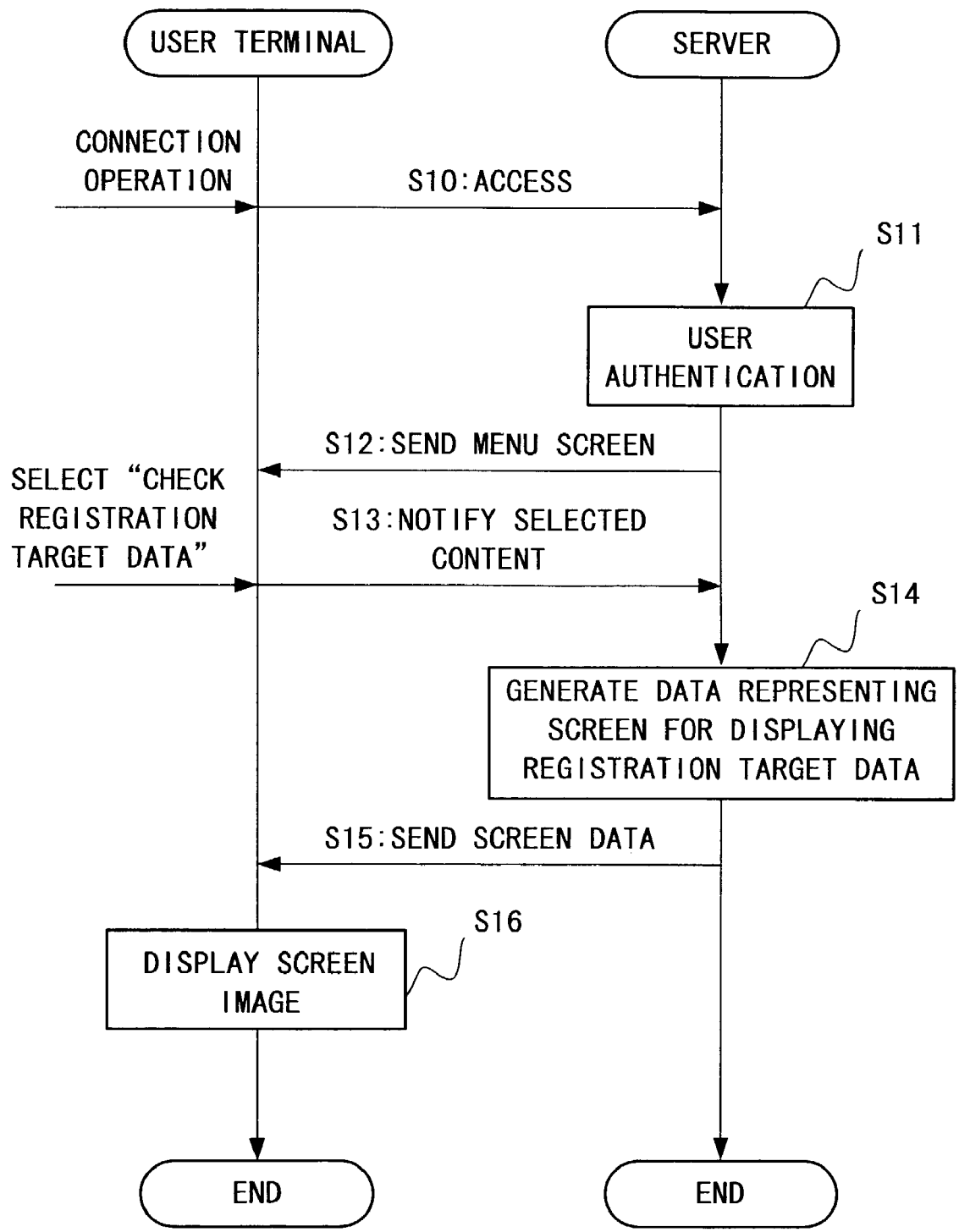
FIG. 9 is a flowchart for explaining an operation of the server, etc.

In a case where the user wants to check the registration target data registered in the server 17, the user operates the user terminal 11 in order to control the user terminal 11 to access the server 17. In response to this operation, the user terminal 11 accesses the server 17 (FIG. 9, step S10). The server 17 sends data representing a screen for prompting the user to input information such as the user ID, etc., to the user terminal 11 which is now accessing the server 17. The user terminal 11 receives the data and displays the screen for inputting information such as the user ID, etc. on the display unit 113.

The user inputs information such as the user ID, etc. by operating the user terminal 11. The user terminal 11 sends the input information to the server 17 in accordance with the operation of the user. The server 17 receives the information, and specifies the user based on the user authentication operation with the received information (step S11).

Figure 7:
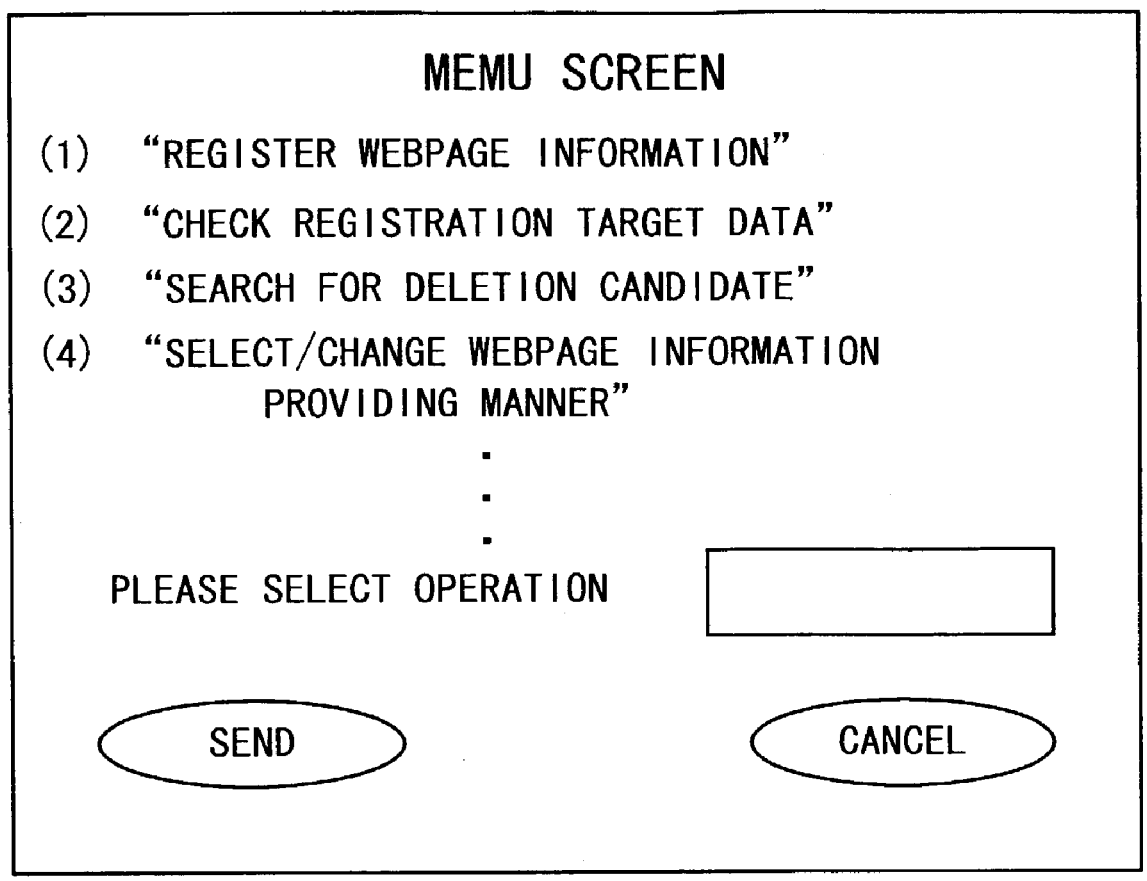
FIG. 7 is a diagram showing an example of a menu screen.

After authenticating the user, the server 17 sends data representing the menu screen shown in FIG. 7 to the user terminal 11 (step S12). The user terminal 11 receives the data and displays the menu screen on the display unit 113.

In this example, it is assumed that the user selects "check registration target data".

In response to the operation of the user, the user terminal 11 notifies the server 17 that the user has selected "check registration target data" (step S13). In response to this notification, the server 17 reads out the web page information providing manner code stored in the storage unit 172, and specifies the user's desired web page information providing manner. Then, the server 17 generates data representing a screen for displaying the user's registration target data registered in the registration DB 172a in accordance with the specified web page information providing manner (step S14).

The operation performed by the server 17 in step S14 will now be specifically explained with reference to FIG. 10, by employing a case where the user's desired web page information providing manner is (4) "List of thumbnails of web pages including search keyword in titles", as an example.

Figure 10:
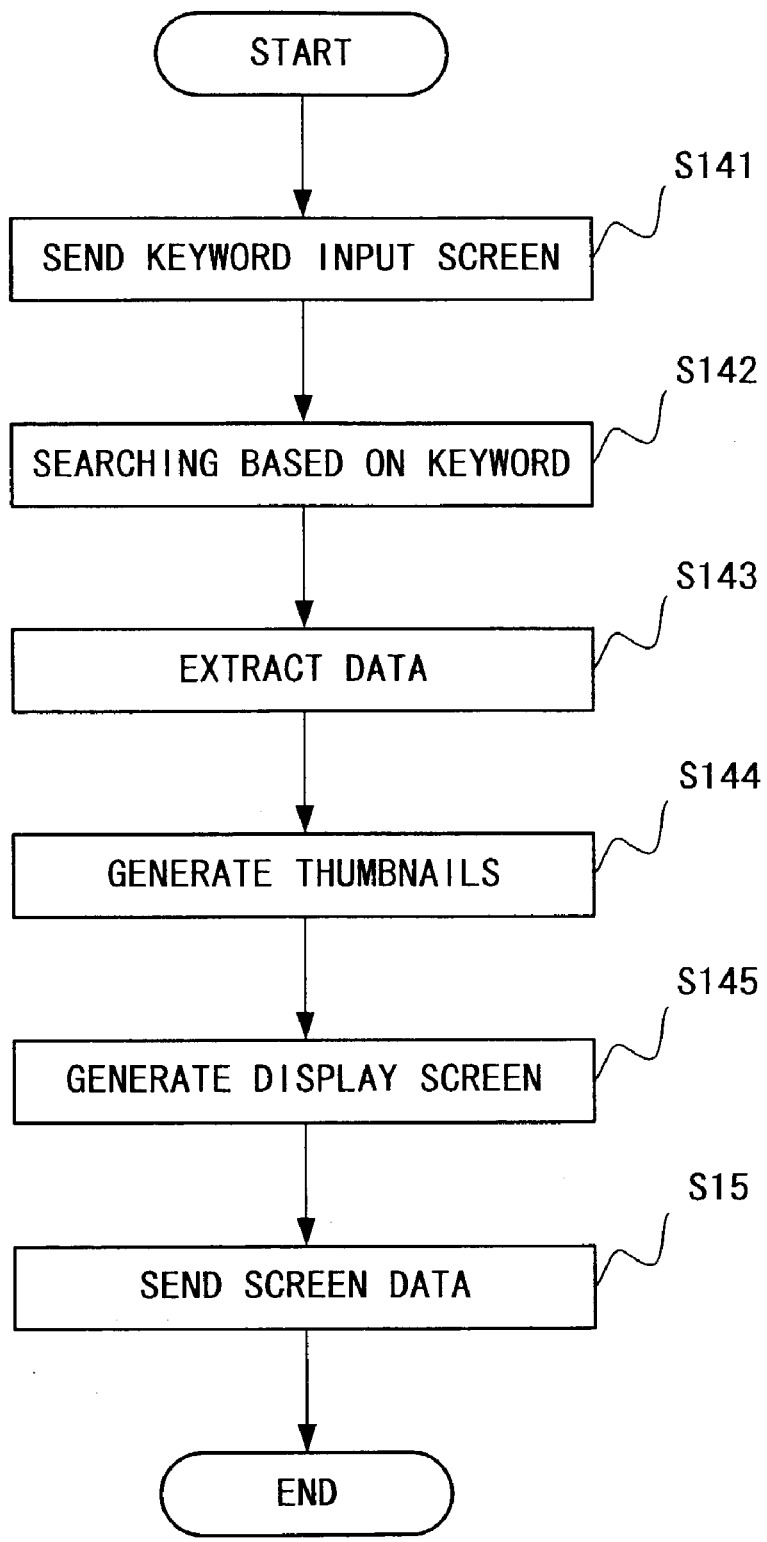
FIG. 10 is a flowchart for explaining an operation of the server.

The server 17 sends data representing a screen shown in FIG. 5B for inputting a search keyword to the user terminal 11 (FIG. 10, step S141). The user terminal 11 receives the data, and displays the screen shown in FIG. 5B on the display unit 113.

The user inputs a keyword using the input unit 114. When the user gives an instruction to search for registration target data based on the input keyword, this instruction is transmitted to the server 17.

In response to this instruction, the server 17 searches for registration target data about web pages which include the keyword in their title, among the registration target data registered by the user (step S142). Then, the server 17 extracts data representing the screen image, the title, and the URL from the searched-out registration target data (step S143).

The server 17 generates thumbnails, using the extracted data representing the screen image (step S144). Next, the server 17 generates data representing a screen for displaying the URLs and titles together with the thumbnails, which is shown in FIG. 5A (step S145).

Then, the server 17 sends the generated screen data to the user terminal 11, as shown in FIG. 9 (FIG. 9, step S15).

The user terminal 11 receives the data representing the screen from the server 17, and displays the screen on the display unit 113 (step S16). Then, both the user terminal 11 and the server 17 once finishes the operation for the user to check the registration target data.

Figure 11:
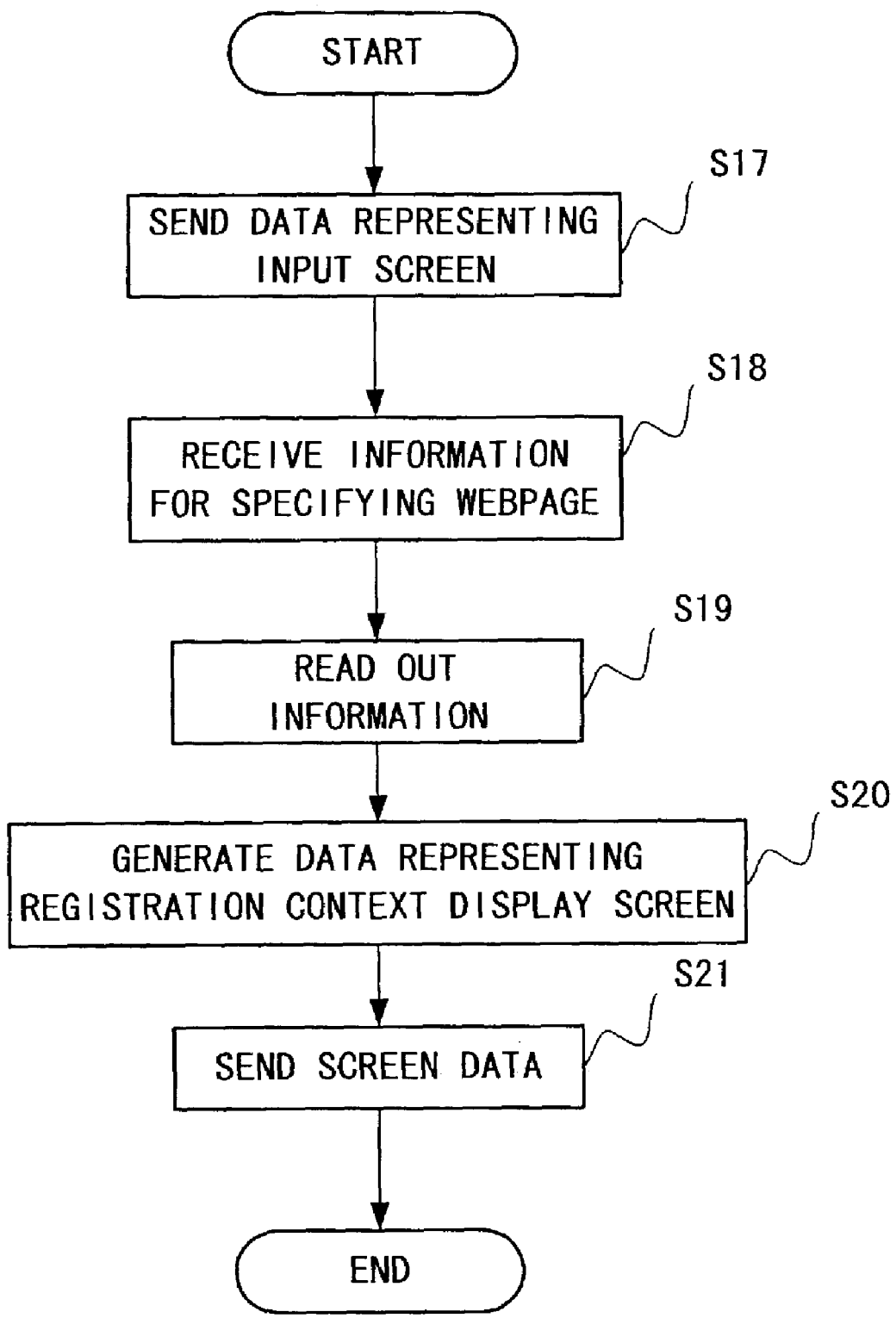
FIG. 11 is a flowchart for explaining an operation of the server.

Next, an operation performed by the server 17 in a case where a web page supplier acquires statistical information to know how many users register the web page supplier's web page in the server 17, will be explained with reference to FIG. 11.

In a case that the web page supplier gives an instruction to obtain a screen for displaying statistical information, this instruction is sent from the web page supplier terminal 15 to the server 17. In response to this instruction, the server 17 sends to the web page supplier terminal 15, data representing a screen for prompting the web page supplier to input information for specifying the web page supplier's web page (such as a URL) (FIG. 11, step S17).

The web page supplier operates the web page supplier terminal 15 and inputs information such as the URL of the supplier's own web page. The web page supplier terminal 15 sends the input information to the server 17 in accordance with the web page supplier's operation.

The server 17 receives the information (step S18). Then, based on the received information, the server 17 retrieves statistical information representing the number of the users who register the web page supplier's web page, from the registration context database 172b (step S19). The server 17 generates data representing a screen (registration context display screen) for displaying the read-out statistical information (step S20), and sends the generated data to the web page supplier terminal 15 (step S21). After the completion of sending the screen data, the server 17 once finishes the operation.

The web page supplier terminal 15 receives the data, and displays the registration context display screen on a display unit (not shown). Then, the web page supplier terminal 15 once finishes the operation.

Figure 12:
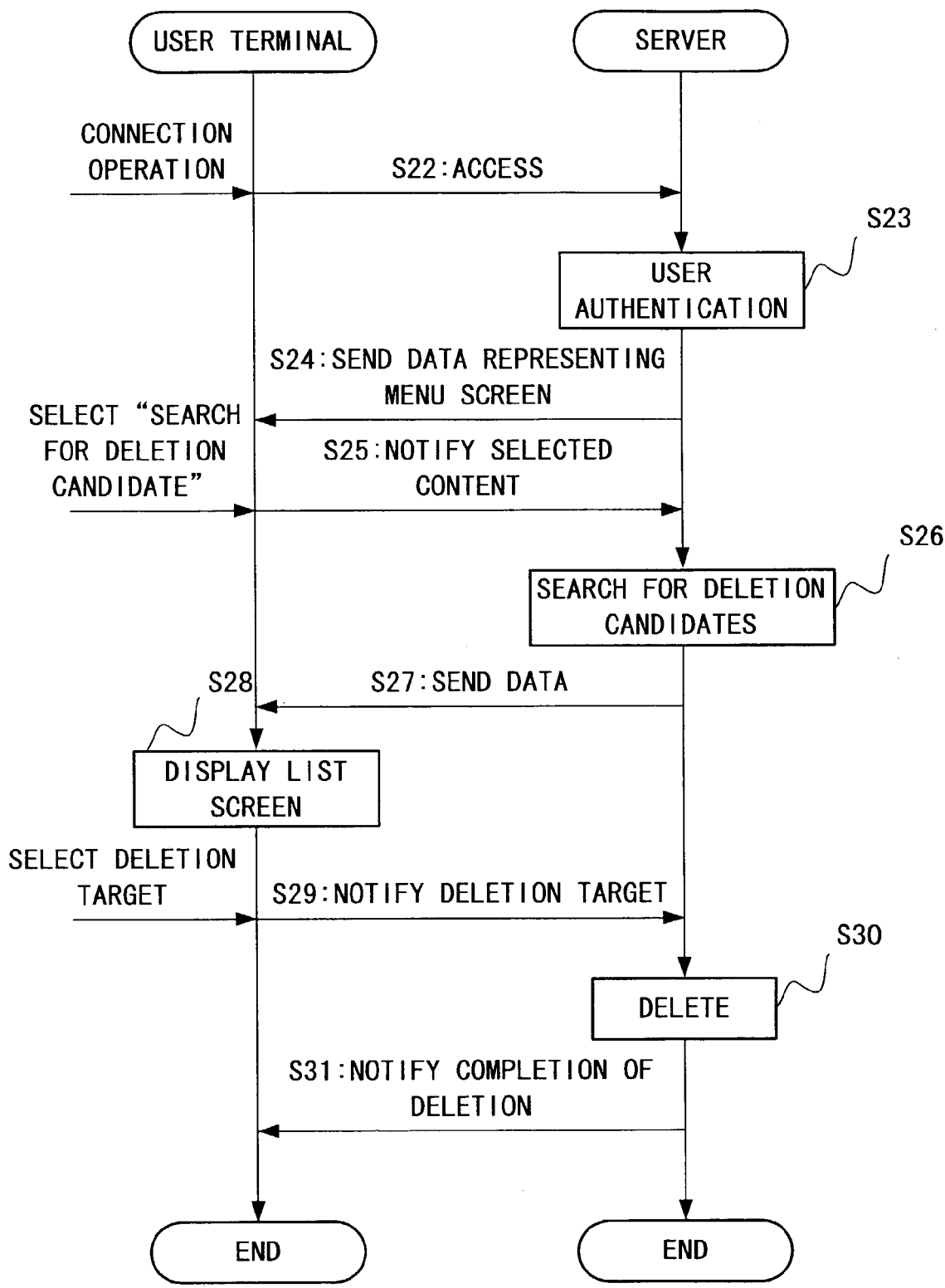
FIG. 12 is a flowchart for explaining an operation of the server.

Next, an operation performed by the server 17 to delete registration target data selected by a user among registration target data registered in the server 17, will be explained with reference to FIG. 7 and FIG. 12.

In a case that a user wants to delete registration target data registered in the server 17, the user operates the user terminal 11 to access the server 17. In accordance with this user's operation, the user terminal 11 accesses the server 17 (FIG. 12, step S22). After the connection with the user terminal 11 is established, the server 17 executes the user authentication described above with the user terminal 11 (step S23).

After authenticating the user, the server 17 sends data representing the menu screen shown in FIG. 7 to the user terminal 11 (step S24). The user terminal 11 receives the data, and displays the menu screen on the display unit 113.

In this example, the user wants to delete a registration target data, thus the user select "search for deletion candidate", by operating the user terminal 11.

In response to this, the user terminal 11 notifies the server 17 that the user has selected "search for deletion candidate" (step S25). In response to this notification, the server 17 searches for registration target data among those registered in the registration DB 172a, that satisfies a predetermined condition (such as a condition that the access number reached in a predetermined period is equal to or less than a predetermined number, etc.), as a deletion candidate (step S26). Next, the server 17 generates a data representing a screen (deletion candidate list screen) for displaying the search result, and sends the generated data to the user terminal 11 (step S27).

The user terminal 11 receives the data, and displays the deletion candidate list screen on the display unit 113 (step S28). The user selects registration target data that the user wants to delete, from this screen. The selection of the registration target as the deletion candidate is the user's option.

When the user selects the deletion candidate and gives an instruction to delete the deletion candidate from the user terminal 11, this instruction is sent to the server 17 (step S29). In accordance with this instruction, the server 17 deletes the registration target data selected by the user from the registration DB 172a (step S30). After the deletion of the registration target data is completed, the server 17 notifies the completion of the deletion to the user terminal 11 (step S31), and finishes the operation of "search for deletion candidate". The user terminal 11 also finishes the operation for deleting the registration target data in response to the notification from the server 17.

As described above, according to the present embodiment, the server 17 stores (registers) information regarding a user's favorite web page in the storage unit 172. The server 17 generates a screen data not only displaying the URL and title of a web page but also displaying the thumbnail of a web page, and sends the screen data to the user terminal 11, at the request of the user terminal 11. Further, the server 17 searches registration target data representing web pages whose title includes a predetermined keyword and also sorts the registration target data based on a registration date, etc. Because of those server's process, a user who utilizes the server 17 can easily find out desired registration target data from among the registration target data registered in the server 17.

Particularly, since the server 17 generates a thumbnail of a screen image of a web page, the user can grasp the content of the web page at a glance, by checking a thumbnail list screen. Further, since the server 17 has a function for keyword searching to search for registration target data registered by a user, the user can quickly find out data regarding a desired web page.

The present invention is not limited to the above-described embodiment. For instance, the layouts of the screens for prompting the user to perform some operation such as inputting are mere examples. Therefore, any layout is acceptable if it can achieve the same effect.

Specifically, a layout for displaying thumbnails in one column is employed for the screen shown in FIG. 5A. however, a layout for displaying thumbnails in one row may be employed instead. Or, a layout for displaying thumbnails in a plurality of rows and columns may be employed for the screen shown in FIG. 5A. How to display thumbnails is not limited to these. For example, a pop-up window may be employed to display thumbnails with one thumbnail overlaid on another.

The web page information providing manners (1) to (17) according to the above-described embodiments are mere examples. The server 17 may executes various operations based on web page information providing manners other than those described above.

For example, in accordance with web page information providing manners other than those described above, the server 17 may extract registration target data regarding a web page which includes an input keyword in its web page content, generate screen data for displaying the extracted registration target in a list, and send the generated data to the user terminal 11.

Or, the server 17 may extract registration target data which includes an input keyword in the content of the data item "user's comments", generate screen data for displaying the extracted data in a list, and send the generated data to the user terminal 11.

In addition, in a case where the registered information providing unit 171b of the server 17 executes an operation in accordance with the web page information providing manners (1), (2), (5) to (9), and (12) to (15), it may generate data representing a screen for displaying both of URLs and titles.

Further, in a case where the registered information providing unit 171b performs an operation in accordance with the web page information providing manners (3), (4), (10), (11), (16), and (17), it may generate data representing a screen for displaying either URLs or titles, together with thumbnails.

Furthermore, the user may be allowed to select a web page information providing manner, every time the user requests the operation of "check registration target data".

How to provide a web page supplier with statistical information is not limited to the one described in the above embodiment. For example, a web page which provides a list concerning all the web pages registered in the registration DB 172a for listing numbers of users who register those web pages, may be sited on the Internet, and web page supplier may check this web page. In this case, the server 17 may generate the web page which displays a list concerning all the registered web pages for listing numbers of users who register those web pages.

According to the above-described embodiment, the explanation has been made by employing a case where the data representing the screen for displaying statistical information stored in the registration context DB 172b is generated by the registration context disclosing unit 171d included in the server 17. However, the present invention is not limited to this. Therefore, the data representing a screen for displaying statistical information may be generated by the administrator terminal 13. In this case, the administrator terminal 13 which operates in accordance with the operation of the administrator may access the server 17, refer to all the registration target data stored in the registration DB 172a. Then, the administrator terminal 13 may generate data representing a screen for displaying statistical information based on the data stored in the registration DB 172a.

The structure of the web page information providing system explained in the above-described embodiment can be arbitrarily changed. For example, the server 17 may be constituted by a plurality of computers which work in cooperation with each other.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This, application is based on Japanese Patent Application No. 2002-167353 filed on Jun. 7, 2002 and including specification, claims, drawings and summary. The disclosure of the above Japanese Patent Application is incorporated herein by reference in its entirety.

What is claimed is:

1. A server connected to a plurality of clients through a network, and which comprises a control unit and a storage unit, wherein said control unit:

(a) receives information regarding a web page which a user of a client obtains by browsing on the Internet;

(b) stores the information regarding the web page in said storage unit in association with an indentification of the user;

(c) reads out, in response to a request from the client, information corresponding to the user of the client which has sent the request, among the information stored in said storage unit;

(d) generates a screen for displaying in a list, contents of the read-out information in accordance with a display format specified by an information providing manner selected by the user from among a plurality of information providing manners for specifying a plurality of display formats, the plurality of display formats specified by the plurality of information providing manners being different from one another;

(e) provides the generated screen to said client which has sent the request, wherein (f) the information includes a web page URL, a title, a screen image, the user's comments on a web page, a category, a registration date, and an access number as elements, and said control unit:

(g) stores, in the storage unit, the information providing manner selected by the user;

(h) extracts a data element out of the web page URL, the title, the screen image, the user's comments on the web page, the category, the registration date, and the access number, in accordance with the stored information providing manner; and (i) generates data representing a screen for displaying, in a list, the data element in accordance with the stored information providing manner.

2. The server according to claim 1, wherein said control unit further generates a screen for displaying thumbnails of screen images of web pages in a list using the screen image.

3. The server according to claim 1, wherein said control unit further:

reads out the information which satisfies a predetermined condition from said storage unit, generates a screen for displaying web pages represented by the read-out information, and provides the screen to said client;

receives specification information for specifying a web page which is selected by the user of said client from among the displayed web pages on the screen, from said client to which the screen has been provided; and deletes the information representing the specified web page from said storage unit, based on the received specification information.

4. The server according to claim 3, wherein said control unit reads out, from said storage unit, information regarding web pages that have been accessed a number of times equal to or less than a predetermined number.

5. The server according to claim 1, wherein said control unit further accesses the information regarding the web pages stored in said storage unit, generates statistical information regarding registration of each web page by users of the clients based on the information in said storage unit, web page by web page, and discloses the generated information through said network.

6. A web page information providing method which is applied to a server connected to a plurality of clients through a network, said method comprising:

(a) receiving information regarding a web page which a user of a client obtains by browsing on the Internet;

(b) storing, in a storage unit, the information regarding the web page in association with an identification of the user;

(c) reading out, in response to a request from the client, information corresponding to the user of the client which has sent the request, among the information stored in said storage unit;

(d) generating a screen for displaying in a list, contents of the read-out information in accordance with a display format which is specified by an information providing manner selected by the user from among a plurality of information providing manners for specifying a plurality of display formats, the plurality of display formats specified by the plurality of information providing manners being different from one another;

(e) providing the generated screen to said client which has sent the request, wherein (f) the information includes a web page URL, a title, a screen image, the user's comments on a web page, a category, a registration date, and an access number as elements, and the method includes (g) storing, in the storage unit, the information providing manner selected by the user;

(h) extracting a data element out of the web page URL, the title, the screen image, the user's comments on the web page, the category, the registration date, and the access number, in accordance with the stored information providing manner; and (i) generating data representing a screen for displaying, in a list, the data element in accordance with the stored information providing manner.

7. The web page information providing method according to claim 6, further comprising generating thumbnails by using screen images of web pages, and generating a screen for displaying the thumbnails in a list.

8. The web page information providing method according to claim 6, comprising:

reading out the information which satisfies a predetermined condition from said storage unit, generating a screen for displaying web pages represented by the read-out information, and providing the screen to said client;

receiving specification information for specifying a web page which is selected by the user of said client from among the displayed web pages on the screen, from said client to which the screen has been provided; and deleting the information representing the specified web page from said storage unit, based on the received specification information.

9. The web page information providing method according to claim 8, further comprising reading out, from said storage unit, information regarding web pages that have been accessed a achieving access number of times equal to or less than a predetermined number.

10. The web page information providing method according to claim 6, further comprising accessing the information regarding the web pages stored in said storage unit, generating statistical information regarding registration of each web page by users of the clients based on the information in said storage unit, web page by web page, and disclosing the generated information through said network.

11. A computer-readable medium tangibly embodying a program which is applied to a server connected to a plurality of clients through a network, said program controlling said server to perform:

(a) a process of receiving information regarding a web page which a user of a client obtains by browsing on the Internet;

(b) a process of storing the information regarding the web page in a storage unit in association with an identification of the user;

(c) a process of reading out, in response to a request from the client, information corresponding to the user of the client which has sent the request, among the information stored in said storage unit;

(d) a process of generating a screen for displaying in a list, contents of the read-out information in accordance with a display format which is specified by an information providing manner selected by the user from among a plurality of information providing manners for specifying a plurality of display formats, the plurality of display formats specified by the plurality of information providing manners being different from one another;

(e) a process of providing the generated screen to said client which has sent the request, wherein (f) the information includes a web page URL, a title, a screen image, the user's comments on a web page, a category, a registration date, and an access number as elements, and the program controls said server to perform (g) a process of storing, in the storage unit, the information providing manner selected by the user;

(h) a process of extracting a data element out of the web page URL, the title, the screen image, the user's comments on the web page, the category, the registration date, and the access number, in accordance with the stored information providing manner; and (i) a process of generating data representing a screen for displaying, in a list, the data element in accordance with the information providing manner.

12. The computer-readable medium according to claim 11, further controlling said server to perform a process of generating thumbnails by using screen images of web pages, and a process of generating a screen for displaying the thumbnails in a list.

13. The computer-readable medium according to claim 11, further controlling said server to perform:

a process of reading out the information which satisfies a predetermined condition from said storage unit, generating a screen for displaying web pages represented by the read-out information, and providing the screen to said client;

a process of receiving specification information for specifying a web page which is selected by the user of said client from among the displayed web pages on the screen, from said client to which the screen has been provided; and a process of deleting the information representing the specified web page from said storage unit, based on the received specification information.

14. The computer-readable medium according to claim 13, further controlling said server to perform a process of reading out, from said storage unit, information regarding web pages that have been accessed a number of times equal to or less than a predetermined number.

15. The computer-readable medium according to claim 11, further controlling said server to perform a process of accessing the information regarding the web pages stored in said storage unit, generating statistical information regarding registration of each web page by users of the clients based on the information in said storage unit, web page by web page, and disclosing the generated information through said network.

* * * * *